United States Patent Office 3,103,513
Patented Sept. 10, 1963

3,103,513
PROCESS FOR PREPARING HEXADEHY-
DROYOHIMBANE DERIVATIVES
Wijbe Thomas Nauta, Amsterdam, Netherlands, assignor
to N.V. Koninklijke Pharmaceutische Fabrieken v/h
Brocades-Stheeman & Pharmacia, Amsterdam, Nether-
lands, a corporation of the Netherlands
No Drawing. Filed Feb. 8, 1961, Ser. No. 87,775
Claims priority, application Netherlands Feb. 12, 1960
1 Claim. (Cl. 260—283)

The invention has for its object a process for preparing hexadehydroyohimbane derivatives.

Several attempts have already been made for the production of compounds having a fair resemblance with natural reserpine or being even identical therewith.

Reference can be made to the investigations carried out by R. B. Woodward et al., a survey of which is published in Tetrahedron, 2, 1–57 (1958).

A method that is partly different but is directed to the same purpose is used by L. Velluz c.s. and published in Bulletin de la Société Chimique de France (1958), 673–77.

The main problem in synthesizing reserpine analogs is that the synthesis involves many steps for preparing a starting material wherein the substituents have a suitable configuration to ensure the right spacial situation in the E-nucleus of the yohimbane system when the starting material is condensed with a suitable indole derivative.

If it is not made a condition that the E-nucleus must be saturated when both parts from which the yohimbane system is composed are reacted together, than the number of steps that are necessary to yield the desired products can be considerably reduced. Many attempts using several processes have been made before to synthesize yohimbane derivatives having an unsaturated E-nucleus (hereinafter called hexadehydroyohimbane derivatives).

Of these attempts can be mentioned the investigations carried out by G. R. Clemo and G. A. Swan (J. Chem. Soc. (1946), 617) on the structure of yohimbane. They synthesized hexadehydrohimbane i.e. the compound:

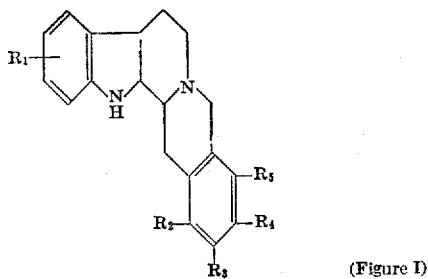

(Figure I)

wherein each of the symbols $R_1$, $R_2$, $R_3$, $R_4$ and $R_5$ represents a hydrogen atom, by converting 2-($\gamma$-carbethoxypropyl)-1,2,3,4-tetrahydroisochinoline 3-carboxylic acid ethyl ester into 7,8-benzo-1,2,3,4,6,9-hexahydropyridocoline 1-one by means of a Dieckmann reaction. The latter compound is thereafter converted into the desired compound with the aid of phenylhydrazine using the Fischer indole synthesis.

The same compound was also prepared by Swan (J. Chem. Soc. (1949), 1720) by first reducing the compound of Formula IV:

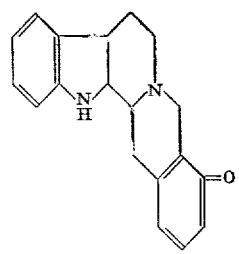

(IV)

with lithium aluminium hydride whereby the keto-group is removed, followed by a hydrogenation in the presence of Adams' catalyst in anhydrous acetic acid under pressure.

The reduction can also be carried out using red phosphorus and hydroiodic acid as a reducing agent.

K. T. Potts and Sir Robert Robinson (J. Chem. Soc. (1955), 2675) have prepared the compound according to Formula I wherein each of the symbols $R_3$ and $R_4$ represent a methoxy group and wherein the other symbols R represent a hydrogen atom by condensing tryptamine with 4,5-dimethoxyhomophthalic acid anhydride. The acid obtained was converted into the methylester by means of diazomethane, which compound was thereafter reacted with phosphoryl chloride. From the acid chloride produced in this manner a cyclic lactam having the nucleus of Figure IV can be obtained under the influence of caustic soda, from which the desired compound can be obtained by reduction with lithium aluminium hydride followed by treatment with active hydrogen.

Finally according to the method found by Hahn c.s. (Ann., 520, 123 (1935)) tryptamine in the form of its hydrochloric acid salt can be condensed with 3,4-dimethoxyphenylpyruvic acid in an aqueous solution by heating the reaction mixture for several days on a water bath with boiling water.

It has now been found that isocoumarine 3-carboxylic acids the manufacture of which is described in Dutch Patent No. 100,024, issued November 18, 1961, are very suitable intermediates in the preparation of hexadehydroyohimbane derivatives.

The new process is characterized in that compounds having the general formula according to Figure I, wherein $R_1$ represents a member of the group consisting of hydrogen atoms, one or more lower alkoxy groups, one or more lower alkyl groups and halogen atoms and each of the symbols $R_2$, $R_3$, $R_4$ and $R_5$ represents a member of the group consisting of hydrogen atoms, lower alkoxy groups and acylated hydroxyl groups are prepared by condensing a tryptamine having the general formula:

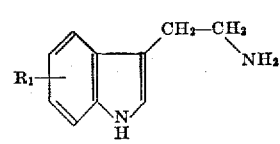

(II)

wherein $R_1$ has the above mentioned meaning, with an isocoumarine 3-carboxylic acid having the formula:

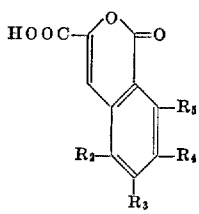

(III)

in which the substituents $R_2$, $R_3$, $R_4$ and $R_5$ have the above indicated meaning; thereafter decarboxylating the obtained reaction product and reducing the resulting compounds. The process according to the invention must be preferred over the known methods hereinbefore described due to the ready availability of the starting products and the ease with which the reactions can be carried out.

It was established, that the condensation of, for instance, 7,8-dimethoxy isocoumarin 3-carboxylic acid and tryptamine cannot be effected in the normally used strongly alkaline medium, because under such reaction conditions only an opening of the ring structure takes place the desired conversion being not realized.

If, however, both components, dissolved in a neutral or weakly acid buffer solution, are added to pyridine or dimethylformamide, a crystalline product is obtained which, according to its U.V.-absorption spectrum, is the salt of tryptamine and the isocoumarin carboxylic acid. Heating of this salt or of a mixture of equivalent quantities of tryptamine and 7,8-dimethoxy isocoumarin 3-carboxylic acid for some hours in pyridine, gives rise to the formation of a carboxylic acid having the composition $C_{22}H_{20}N_2O_5$. As isocoumarin 3-carboxylic acid is known to react with ammonia and with some amines (Ber., 27, 205 (1894), Bamberger and Fren) to form isocarbostyril carboxylic acids, the structure according to Figure V:

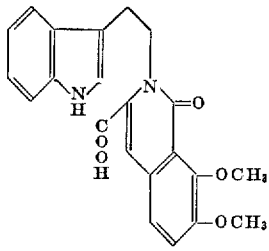

(V)

was attributed to the compound of the composition $C_{22}H_{20}N_2O_5$. Decarboxylation of this compound can easily be brought about by heating with copper powder, yielding a neutral compound of the composition $C_{21}H_{20}N_2O_3$.

The latter compound was proved to have the structure of Figure VI:

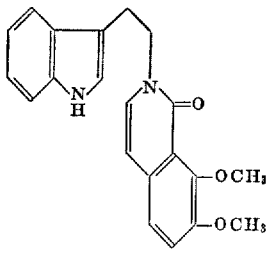

(VI)

Isomerisation by which the compound undergoes ring closure, which usually can be effected with similar compounds by treating them with an acid, proved to be impossible in this case. If, however, the compound with the formula of Figure VI is subjected to a reduction with lithium aluminium hydride not only the carbonyl group is removed but an amine is formed which has the structure of Figure VII:

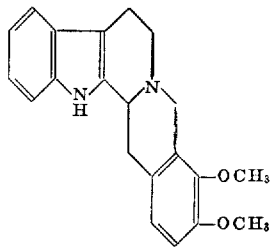

(VII)

All structures proposed have been affirmed by an interpretation of the U.V. absorption spectra.

Apart from tryptamine also derivatives thereof having a substituent in the benzene nucleus can be used for the reaction with isocoumarin 3-carboxylic acids. Examples of such substituted tryptamines are:

6-fluorotryptamine
5-methoxytryptamine
6-chlorotryptamine
6,7-dichlorotryptamine
5-chloro-6-methoxytryptamine
7-methyltryptamine The following examples elucidate the invention.

EXAMPLE 1

(a) *Preparation of the Salt of Tryptamine and 7,8-Dimethoxyisocoumarin-3-Carboxylic Acid*

Tryptamine (1.5 g.) was dissolved in 30 ml. of a buffer solution at pH 6.6 and added to a solution of 1.7 g. of 7,8-dimethoxyisocoumarin-3-carboxylic acid in 100 ml. of the same buffer. The mixture was allowed to stand for 3 hours at room temperature. The precipitated salt was collected and dried.

Yield 2.5 g. (85%). M.P.: 195–196.5° C.

Calc. for $C_{22}H_{22}O_6N_2$: C, 64.4%; H, 5.4%. Found: C, 64.2%; H, 5.4%.

(b) *Preparation of N-(β-(3-Indolyl)Ethyl)7,8-Dimethoxyisocarbostyril-3-Carboxylic Acid*

4 grams of the above salt were added to 60 ml. of pyridine and the mixture was refluxed for 3 hours. The solvent was then removed by distillation in vacuo and to the residue some 2 N sodium hydroxide was added, the solution filtered through active coal and acidified. The precipitate formed was filtered off and purified by dissolving in 50 ml. of water with an equivalent quantity of sodium hydroxide, adding 75 ml. of acetone, heating the solution to about 50° C. and acidifying with 2 N hydrochloric acid. The compound, which slowly crystallized in white needles from the solution, was collected on a filter, washed with water and dried.

Yield: 3.2 g. (84%). M.P. 249.5–250° C.

Calc. for $C_{22}H_{20}N_2O_5$ (392.40): C, 67.3; H, 5.1; N, 7.1. Found: C, 67.1; H, 5.3; N, 7.3.

(c) *Preparation of N-(β(3-Indolyl)Ethyl)7,8-Dimethoxyisocarbostyril*

The above acid (1.25 g.) was heated with copper powder (0.1 g.) at 230° C. in an atmosphere of nitrogen for 10 minutes. The reaction product was extracted with hot methanol, the solution filtered through Norit, concentrated and cooled. The precipitate was filtered off and dried.

Yield: 0.55 g. (50%). M.P.: 226–228° C.

For analysis the compound was crystallized twice from methanol, from which it was obtained in glittering needles with M.P. 226–228° C.

Calc. for $C_{21}H_{20}N_2O_3$ (348.39): C, 72.4; H, 5.7; N, 8.0. Found: C, 72.8; H, 5.9; N, 7.8.

The above mentioned isocarbostyril can also be obtained in the following manner:

Tryptamine (0.35 g.) and 7,8-dimethoxyisocoumarin (0.40 g.) were dissolved in 20 ml. of dimethylformamide and the solution was refluxed for 3 hours. After cooling, 50 ml. of water were added. The slightly yellow precipitate was filtered off and, after crystallization from methanol, yielded 0.20 g. (30%) of the isocarbostyril described above with M.P. 226–228° C.

Mixed melting point showed no depression.

*(d) Preparation of 18,19-Dimethoxy-15,16,17,18, 19,20-Hexadehydroyohimbane*

400 mg. of the lactam N-[β-(3-indolyl)ethyl]7,8-dimethoxyisocarbostyril were dissolved in 120 ml. of tetrahydrofuran and treated with 15 ml. of ether containing 390 mg. LiAlH$_4$. The solution was refluxed for three hours in an atmosphere of pure nitrogen. After cooling and decomposing the reaction mixture with wet tetrahydrofuran, 40 ml. of 2 N hydrochloric acid were added and the tetrahydrofuran evaporated in vacuo. The hydrochloride of 18,19-dimethoxy 15,16,17,18,19,20-hexadehydroyohimbane separated from the remaining aqueous solution first as a thick syrupy mass, which became crystalline after some time. The crystals were filtered off, dried, boiled with chloroform and filtered off again. The hydrochloride (430 mg.) was then converted into the free base by suspension in 20 ml. of water and treated with 20 ml. 4 N ammonia. The mixture was then extracted three times with 20 ml. portions of chloroform, the combined violet-coloured chloroform layers washed once with water and dried over magnesium sulphate. Evaporation to dryness afforded an impure amine which was purified by two crystallizations from aqueous acetone.

Yield: 180 mg. (47%). M.P. 174–175° C. (white needles).

Calc. for C$_{21}$H$_{22}$N$_2$O$_2$ (334.40): C, 75.4; H, 6.6; N, 8.4. Found: C, 75.7; H, 6.7; N, 8.2.

EXAMPLE 2

*(a) Preparation of N-[β-(3-Indolyl)Ethyl]Isocarbostyril-3-Carboxylic Acid*

To 500 ml. of pyridine were added 19.0 g. of isocoumarin-3-carboxylic acid and 19.0 of tryptamine. The mixture was refluxed for 6 hours, after which the solvent was removed completely by distillation in vacuo. To the residue, 100 ml. of 1 N sodium hydroxide and 500 ml. of water were added and the solution was extracted three times with ether, filtered through active coal and acidified. The tough mass obtained crystallized after some time; the solid was collected and crystallized from methanol, affording 14.5 g. of a yellow compound with M.P. 204–205° C. From the liquor a further 9.0 g. were obtained by concentration and subsequent addition of benzene.

Total yield: 23.5 g. (70%).

The compound is obtained in the form of yellow prisms, M.P. 206–207° C.

Calc. for C$_{20}$H$_{16}$N$_2$O$_3$ (332.35): C, 72.3; H, 4.8; N, 8.4. Found: C, 72.5; H, 4.9; N, 8.3.

*(b) Preparation of N-[β-(3-Indolyl)Ethyl]Isocarbostyril and 15,16,17,18,19,20-Hexadehydroyohimbane 21-On*

A quantity of 9.7 g. of N-[β-(3-indolyl)ethyl]3-carboxy isocarbostyril was mixed with 0.2 g. of copper powder and heated for 15 minutes at 245° C. in an atmosphere of nitrogen. After cooling, the reaction mixture was extracted with 200 ml. of boiling benzene. The solution obtained was filtered through Norit and the benzene evaporated. Treatment of the residue, a red syrup, with ether yielded a white crystalline substance. This was filtered off, washed with ether and crystallized from methanol.

Yield: 0.97 g. (11%) of 15,16,17,18,19,20-hexadehydroyohimbane 21-on with M.P.: 245–246° C.

The red ethereal solution was concentrated and cooled to 0° C. to give 0.75 g. of a substance with M.P. 145–148° C.

Further concentration of the mother liquor again produced a red syrup. This was dissolved in a hot mixture of methanol and water (1:1), the solution was boiled with Norit, filtered, cooled and treated drop by drop with water. The crystalline precipitate thus obtained was filtered off, dried and crystallized from benzene to give 1.7 g. of a substance with M.P. 143–150° C. The combined quantities of the low melting compound were crystallized once more from benzene.

Yield: 1.88 g. (22%) of N-β-(3-indolyl)ethyl isocarbostyril with M.P. 151–153° C.

Calc. for C$_{19}$H$_{16}$N$_2$O (288.34): C, 79.2; H, 5.6; N, 9.7.

Found for 15,16,17,18,19,20 - hexadehydroyohimbane 21-on: C, 79.0; H, 5.6; N, 10.0; for N-β-(3-indolyl)ethyl isocarbostyril: C, 79.2; H, 5.7; N, 9.6.

*(c) Preparation of 15,16,17,18,19,20 - Hexadehydroyohimbane 21-On From N-[β-(3-Indolyl)Ethyl] Isocarbostyril*

A quantity of 0.50 g. of N-[β-(3-indolyl)ethyl] isocarbostyril (M.P. 151–153° C.) prepared according to Example 2(b) was dissolved in 100 ml. of methanol. To the solution of 50 ml. of 10 N sulphuric acid were added and the mixture was refluxed for half an hour. At first the solution turned violet but at the end the colour disappeared. Then 100 ml. of water were added and the solution was concentrated on a steam-bath to about 150 ml., during which operation the solution again turned an intense violet.

After cooling, the precipitate formed was collected and crystallized from methanol. The colourless needles melted at 245–246° C. The mixed melting point with hexadehydroyohimbane 21-on showed no depression.

Yield: 0.43 g. (86%).

*(d) Preparation of 15,16,17,18,19,20 - Hexadehydroyohimbane From 15,16,17,18,19,20-Hexadehydroyohimbane 21-On*

0.5 gram of 15,16,17,18,19,20-hexadehydroyohimbane 21-on was dissolved in 60 ml. of dry tetrahydrofuran and to the solution 15 ml. of ether, containing 0.39 g. LiAlH$_4$, were added. The mixture was refluxed for 3 hours in an atmosphere of pure nitrogen. The reaction mixture was then decomposed with water in tetrahydrofuran after which 40 ml. of 2 N hydrochloric acid were added. The tetrahydrofuran was distilled off under reduced pressure and the remaining aqueous solution was cooled. The yellowish hydrochloride of 15,16,17,18,19, 20-hexadehydroyohimbane, which had separated, was filtered off, washed with some ice-cold water, dried, boiled with chloroform to remove any neutral compounds present and filtered off.

The impure hydrochloride (0.53 g.) was suspended in 20 ml. of water and treated with 20 ml. of 2 N ammonia, after which the mixture was extracted three times with 20 ml. portions of chloroform. The combined chloroform layers were dried over magnesium sulphate and evaporated to dryness.

The residue (0.5 g.) was crystallized from 65% ethanol with subsequent concentration of the mother liquor.

Yield: 0.42 g. (88%). M.P.: 190–193° C.

For analysis it was once more crystallized from aqueous methanol.

M.P.: 192–194° C.

Calc. for C$_{19}$H$_{18}$N$_2$ (274.35); C, 83.1; H, 6.6; N, 10.2. Found: C, 82.8; H, 6.4; N, 10.5.

*(e) Preparation of 15,16,17,18,19,20-Hexadehydroyohimbane from 3-(β-Indolyl)Ethyl Isocarbostyril*

0.5 gram of N-[3-(β-indolyl)ethyl]isocarbostyril was reduced with LiAlH₄ in exactly the same way as described above in Example 2(d).

Yield: 0.41 (85%) 15,16,17,18,19,20-hexadehydroyohimbane, M.P. 189–191° C.

After one more crystallization from aqueous methanol the compound melted at 192–194° C. The mixed melting point with the product prepared from 15,16,17,18,19,20-hexadehydroyohimbane 21-on showed on depression. The melting point could be raised to 194–195° C. by crystallization from aqueous acetone.

What I claim is:

A process for preparing a compound of the formula

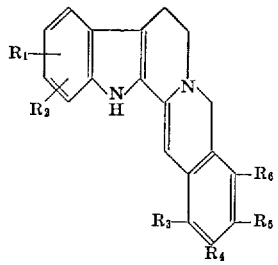

wherein $R_1$ and $R_2$ each represent a member of the group consisting of hydrogen, lower alkoxy, lower alkyl and halogen and wherein $R_3$, $R_4$, $R_5$ and $R_6$ each represents a member of the group consisting of hydrogen, lower alkoxy, lower alkanoyloxy, benzoyloxy and 3.4.5-tri(lower)alkoxy substituted benzoyloxy, which comprises heating, under reflux, in pyridine a tryptamine of the formula

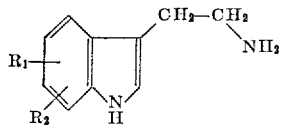

in which $R_1$ and $R_2$ have the above stated values with an isocoumarin carboxylic acid of the formula

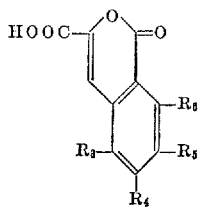

in which $R_3$, $R_4$, $R_5$ and $R_6$ have the above stated values, thereby forming a compound of the formula

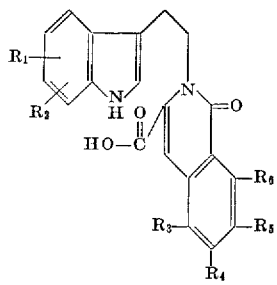

in which $R_1$, $R_2$, $R_3$, $R_4$, $R_5$, $R_6$ have the above stated values, heating said compound with copper powder at temperatures exceeding 200° C. in an atmosphere of nitrogen, whereby it is converted into a compound of the formula

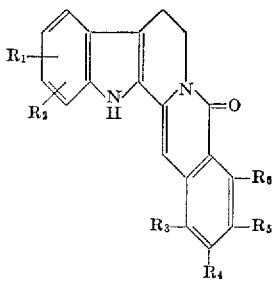

in which $R_1$, $R_2$, $R_3$, $R_4$, $R_5$ and $R_6$ have the above stated values and treating a solution of said compound in an inert organic solvent with lithiumaluminium-hydride whereby it is reduced.

References Cited in the file of this patent

Logemann et al.: Chem. Ber., volume 88 (1955), pages 1952–1956.

Chemical Abstracts, volume 51 (1957), Subject Index, page 2577.

Raymond-Hamet: Compte Rendu, volume 247 (1958), pages 1913–1915.

Chemical Abstracts, volume 53 (1959), Subject Index, page 3018.

Naito et al.: Chemical Abstracts, volume 54 (1960), page 22700.

UNITED STATES PATENT OFFICE
CERTIFICATE OF CORRECTION

Patent No. 3,103,513             September 10, 1963

Wijbe Thomas Nauta

It is hereby certified that error appears in the above numbered patent requiring correction and that the said Letters Patent should read as corrected below.

Column 7, lines 13 to 23, the formula should appear as shown below instead of as in the patent:

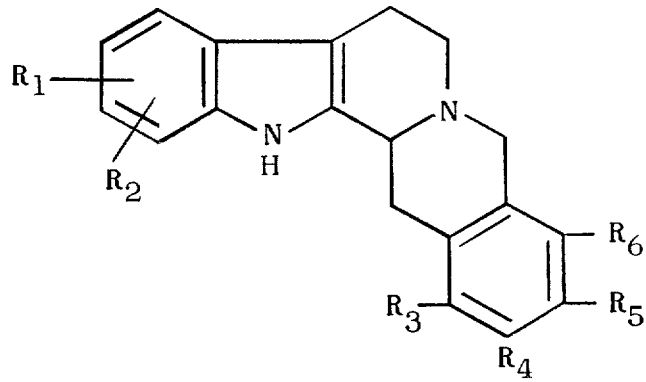

Signed and sealed this 12th day of May 1964.

(SEAL)
Attest:

ERNEST W. SWIDER                       EDWARD J. BRENNER
Attesting Officer                     Commissioner of Patents